No. 636,972.  
J. H. FRANKLIN.  
RULE.  
(Application filed Mar. 14, 1899.)  
Patented Nov. 14, 1899.

(No Model.)

Witnesses,

Inventor,
John H. Franklin
By Dewey Strong & Co.
atty

UNITED STATES PATENT OFFICE.

JOHN H. FRANKLIN, OF SAN FRANCISCO, CALIFORNIA.

RULE.

SPECIFICATION forming part of Letters Patent No. 636,972, dated November 14, 1899.

Application filed March 14, 1899. Serial No. 709,028. (No model.)

*To all whom it may concern:*

Be it known that I, JOHN H. FRANKLIN, a citizen of the United States, residing in the city and county of San Francisco, State of California, have invented an Improvement in Rules; and I hereby declare the following to be a full, clear, and exact description of the same.

My invention relates to improvements in carpenters' measuring-rules.

It consists, essentially, in the application of a marking device to the end of the rule, so that when measuring lengths in which the rule is repeatedly moved the end of each measurement is marked without the use of any supplemental marker.

Figure 1:
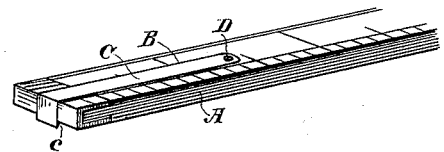
Figure 2:
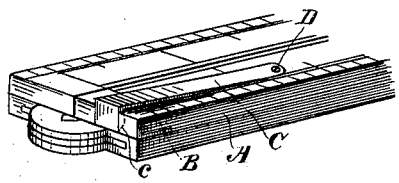

Referring to the accompanying drawings, Figure 1 is a view of the end of a rule. Fig. 2 shows the rule folded up.

A is the end of a rule of the usual kind used by carpenters. When such rules are used for measuring lengths greater than the length of the rule, it is necessary to make a mark of some description at the end of the rule at each time when it is applied, this mark serving as a point from which the next measurement is commenced, and so on until the distance is accomplished. This makes it necessary ordinarily to use a pencil, which is never accurate, because the mark is made a little distance beyond the end of the rule, or a knife-blade or other similar device, which is inconvenient. In my invention I channel the top and end of the rule, as shown at B, and in this channel is fitted a spring-strip C. The end which extends along the side of the rule is secured by a screw or other fastening, as shown at D, and the end which is bent at right angles therewith fits in a corresponding channel made in the end of the rule, so that the spring-arm at this point lies exactly flush and even with the end of the rule. The lower end of this spring-arm is beveled and sharpened, as shown at c, and when the rule is open it normally projects a little below the lower side of the rule, so that when the rule is placed upon a surface for the purpose of measuring when this end is pressed down this sharp edge c makes a little mark exactly in line with the end of the rule, and this mark serves as the commencement for the next application of the rule, and so on for as many repetitions of the length of the rule as are necessary. When the rule is closed, as shown in Fig. 2, the parts closing against each other, this point or edge will rest against the opposing part of the rule and will not catch in the clothing or anything else.

Having thus described my invention, what I claim as new, and desire to secure by Letters Patent, is—

1. The combination with a rule, of an elastic plate fixed at one end to said rule and having its opposite end bent to lie in the plane of the end of the rule whereby the edge portion serves as a marker for a subsequent measurement.

2. A combination with a folding rule of an elastic plate bent at right angles having one end fixed to the side of the rule and the other portion of the angle extending across the end having the edge sharpened substantially as described.

3. A folding measuring-rule having a channel formed in one side near the end, a corresponding channel extending transversely across the end and in line with the first-named channel, an elastic strip of steel bent at right angles and fitting in the two channels aforesaid, the end section projecting slightly beyond the lower face of the rule and being sharpened to form an edge in line with the end of the rule, and a means whereby the opposite end is secured in the channel.

In witness whereof I have hereunto set my hand.

JOHN H. FRANKLIN.

Witnesses:
L. SONNTAG,
N. FRANKLIN.